United States Patent [19]

Niwa et al.

[11] Patent Number: 5,063,098

[45] Date of Patent: Nov. 5, 1991

[54] VIBRATION DAMPING MATERIALS AND SOUNDPROOFING STRUCTURES USING SUCH DAMPING MATERIALS

[75] Inventors: Takahiro Niwa, Nara; Yasuo Shimizu, Chiba, both of Japan

[73] Assignee: Nichias Corporation, Tokyo, Japan

[21] Appl. No.: 326,611

[22] Filed: Mar. 21, 1989

[30] Foreign Application Priority Data

Apr. 1, 1988 [JP] Japan .................................. 63-80382
Jul. 13, 1988 [JP] Japan ................................ 63-172619

[51] Int. Cl.$^5$ .......................... B32B 1/04; B32B 15/08
[52] U.S. Cl. ...................................... 428/76; 428/421; 428/458; 428/461; 428/462; 428/463; 428/492
[58] Field of Search ................. 428/324, 461, 463, 68, 428/76, 428, 462, 421, 492

[56] References Cited

U.S. PATENT DOCUMENTS 4,623,586 11/1986 Umeya et al. ...................... 428/324

Primary Examiner—Thomas J. Herbert, Jr.
Attorney, Agent, or Firm—Flynn, Thiel, Boutell & Tanis

[57] ABSTRACT

A vibration damper includes two materials, each being formed of a metal sheet having a rubber- or synthetic resin-base viscoelastic polymeric layer or layers formed on one or both sides, which are arranged in opposition to each other through said viscoelastic layers and bonded together with the use of a hot-melt-adhesive synthetic resin layer having a high melting point. Alternatively, one of said materials is arranged in opposition to another metal sheet through said vicoelastic layer or layers and bonded thereto with the use of said hot-melt-adhesive synthetic resin layer. A soundproofing structure using such a vibration damper is also provided.

18 Claims, 12 Drawing Sheets

A: (0.9mm)
6: (50mm)
5

A': (0.5mm)
6: (50mm)
5

- A: (0.9 mm)
- 7: (1 mm)
- 6: (50 mm)
- 7: (1 mm)
- 6: (50 mm)
- 5

- A': (0.5 mm)
- 7: (1 mm)
- 6: (50 mm)
- 7: (1 mm)
- 6: (100 mm)
- 5

- A : (0.9 mm)
- 7 : ( 1 mm)
- 6 : (125 mm)
- 7 : (0.5 mm)
- 6 : (125 mm)
- 5

- A' : (0.5 mm)
- 7 : (15 mm)
- 6 : (125 mm)
- 7 : (0.5 mm)
- 6 : (125 mm)
- 5

VIBRATION DAMPING MATERIALS AND SOUNDPROOFING STRUCTURES USING SUCH DAMPING MATERIALS

BACKGROUND OF THE INVENTION

1. Field of the Invention

The present invention is concerned with an improvement in or relating to a composite type of vibration damping material (which may hereinafter be referred to as the vibration damper) comprising a metal sheet and a viscoelastic polymeric material and a soundproofing structure using such a material.

2. Statement of the Prior Art

As the composite type of vibration damping materials comprising a metal sheet and a viscoelastic polymeric material, there have been known one vibration damper formed of a thin steel sheet 1 and a rubber- or synthetic resin-base viscoelastic polymeric layer 2 bonded to both sides thereof, as illustrated in FIG. 22, and another vibration damper formed by sandwiching and bonding a viscoelastic polymeric layer 2 between two steel sheets 1, as illustrated in FIG. 23.

The vibration damper of FIG. 22 is called the non-constraint type and can damp vibration due to the "extensional deformation" of the viscoelastic layer in association with flexural vibration, whereas the vibration damper of FIG. 23 is referred to as the constraint type and can damp vibration due to the "shearing deformation" of the viscoelastic layer in association with flexural vibration. From a comparison of the non-constraint and constraint types of dampers, it is found that there is a considerable difference therebetween in that the constraint type is effective with a thin viscoelastic layer, but the non-constraint type needs a viscoelastic layer three to four times as thick as a steel sheet.

Said composite type of vibration dampers are used in a wide range of industrial fields such as automotive engine mounts, disc brakes, oil pans, transmissions, compressors, air cleaners, brake clutches, electronic ranges, speakers and players.

As mentioned above, the aforesaid composite type of vibration dampers are now increasingly used in various industrial fields due to their superior damping capacity. In actual applications, however, they are often used in severer environments where various factors such as temperature, pressure, oils, solvents and coolants are applied alone or in combination, rather than in relatively moderate environments at normal temperature, under no load and in the atmosphere. There is thus still demanded a vibration damping material that can sufficiently meet such requirements.

In particular, the aforesaid composite type of vibration damper is intimately related to the thickness of the metal sheet and viscoelastic layer forming it. One problem with this damper is that the thicker the metal sheet, the higher the mechanical strength but the lower the damping capacity. Another problem is that increases in the thickness of the viscoelastic layer result in decreases in both the resistance to heat and pressure and the mechanical strength. This vibration damper should thus be designed while taking such problems into account.

SUMMARY OF THE INVENTION

A main object of the present invention is to improve the conventional composite type of vibration dampers and provide a vibration damping material which is less affected by the thickness of a metal sheet and a viscoelastic layer forming it, and combines improved damping capacity with improved resistance to pressure, heat, solvents, oils and the like in severe environments.

Another object of the present invention is to obtain such a vibration damping material at lower costs on a mass-production scale.

A further object of the present invention is to provide a soundproofing structure using such a vibration damping material as mentioned above.

According to the present invention, the aforesaid objects and problems are achieved and solved by the provision of a vibration damping material wherein a metal sheet having a rubber- or synthetic resin-base viscoelastic polymeric layer or layers formed on one or both sides is combined with a metal sheet including no viscoelastic polymeric layer to provide materials, and said materials are arranged in opposition to each other through the viscoelastic polymeric layer(s) and laminated together with a hot-melt-adhesive resin film having a high melting point.

According to the present invention, there is also provided a soundproofing structure characterized in that a noise generating portion is surrounded by a sound absorbing material, a sound insulating material and so on, and the aforesaid vibration damping material is used as an outermost cladding panel.

In the vibration damping material of the aforesaid structure, the viscoelastic polymeric layer(s) preformed on the metal sheet(s) and the synthetic resin film layer used for lamination are sandwiched between the metal sheets arranged in opposition to each other. Thus, both the layers act synergistically to produce a vibration damping effect.

In the aforesaid soundproofing structure, the aforesaid composite type of vibration damping material is used as the cladding panel. Thus, without using sound insulating materials forming conventional soundproofing structures such as lead or iron sheets, mortar and hard cement, it is possible to obtain a soundproofing effect equivalent to that achieved therewith.

BRIEF DESCRIPTION OF THE DRAWINGS

The present invention will now be explained with reference to the accompanying drawings, which are given for the purpose of illustration alone, and in which.

DETAILED EXPLANATION OF THE INVENTION

Referring now to FIGS. 1 to 8, there are shown various embodiments of the constraint type of vibration dampers according to the present invention.

Figure 1:
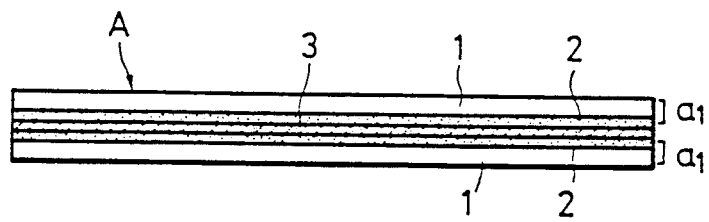
FIGS. 1 to 8 are side views showing various embodiments of the present invention.

A vibration damper A, shown in FIG. 1, includes two materials $a_1$, each being obtained by forming a rubber- or synthetic resin-base viscoelastic polymeric layer 2 on one side of a metal sheet 1. While the viscoelastic layers 2 are in opposition to each other, the materials are laminated together with the use of a hot-melt-adhesive synthetic resin film 3 having a high melting point.

Figure 2:
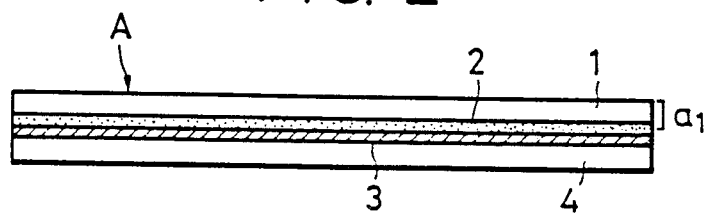

A vibration damper A, shown in FIG. 2, includes said material $a_1$ having the viscoelastic layer 2 and a metal sheet 4 located in opposition thereto and laminated thereon with the use of said hot-melt-adhesive synthetic resin film 3 having a high melting point.

Figure 3:
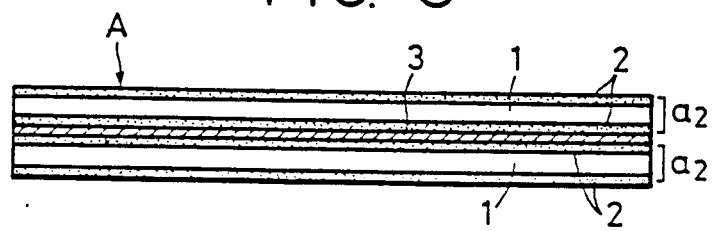

A vibration damper A, shown in FIG. 3, includes two materials $a_2$ laminated together with the use of said hot-melt-adhesive synthetic resin film 3, each of said materials $a_2$ having said viscoelastic polymeric layers 2 previously formed on both sides of a metal sheet 1.

Figure 4:
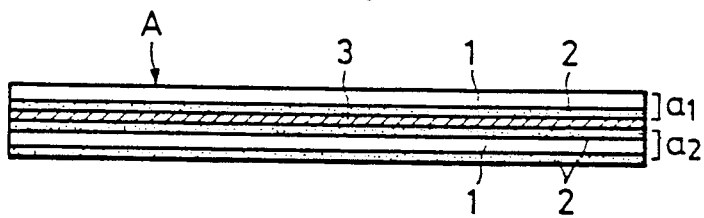

A vibration damper A, shown in FIG. 4, includes said material $a_1$ having its viscoelastic layer 2 arranged in opposition to and laminated on said material $a_2$ with the use of a hot-melt-adhesive synthetic resin film 3 having a high melting point.

Figure 5:
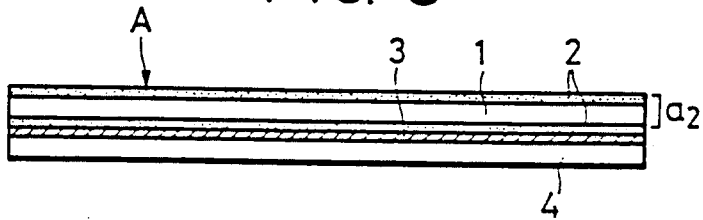

A vibration damper A, shown in FIG. 5, includes said material $a_2$ located in opposition to and laminated on a metal sheet 4 with the use of a hot-melt-adhesive synthetic resin film 3 having a high melting point.

Figure 6:
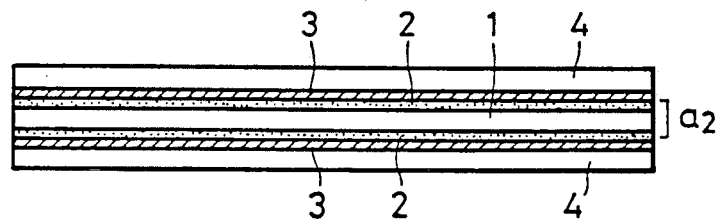

A vibration damper A, shown in FIG. 6, includes metal sheets 4 arranged in opposition to and laminated on both the viscoelastic layers 2 of said material $a_2$ with the use of said hot-melt-adhesive synthetic resin films 3.

Figure 7:
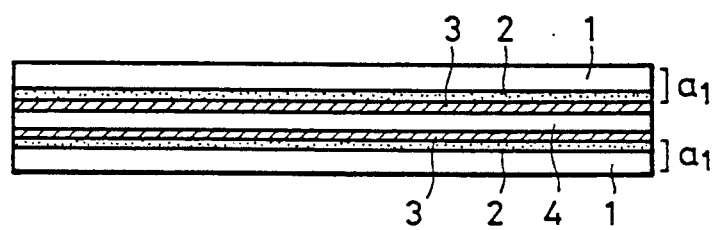

A vibration damper A, shown in FIG. 7, includes a metal sheet 4 and said materials $a_1$ having their viscoelastic layers 2 arranged in opposition to and laminated on both sides of said sheet 4 with the use of a hot-melt-adhesive synthetic resin films 3.

Figure 8:
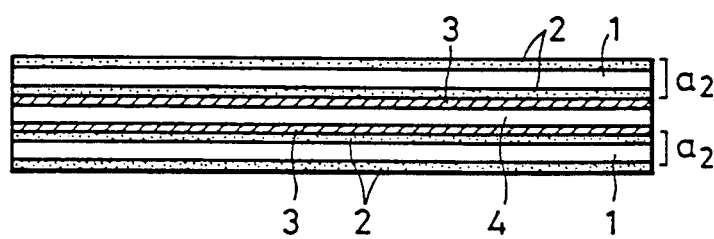

A vibration damper A, shown in FIG. 8, includes a metal sheet 4 and said materials $a_2$ located in opposition to and laminated on both sides of said sheet 4 with the use of said hot-melt-adhesive synthetic resin films 3.

As the metal sheet 1 forming a part of each of said vibration dampers A, use may be made of an iron sheet (a cold-rolled steel sheet), an aluminium sheet, a stainless steel sheet, a brass sheet, a copper sheet, a zinc sheet, a nickel sheet and a tin sheet.

Usable as said viscoelastic polymeric layer 2 are acrylonitrile-butadiene rubber (NBR), styrene-butadiene rubber (SBR), natural rubber (NR), butyl rubber (IIR), ethylene-propylene polymer (EPDM), butadiene rubber (BR), isoprene rubber (IR), chloroprene rubber (CR), ethylene propylene rubber (EPM), acrylic rubber (ACM), silicon rubber, fluorine rubber (FKM), epichlorohydrin rubber (CO, ECO), urethane rubber (U), polynorbornene rubber, ethylene acrylic rubber and other rubber.

Usable as said hot-melt-adhesive synthetic resin film 3 having a high melting point are polyamides such as nylons, polyesters such as polyester, polyolefins such as polypropylene and polyethylene, fluorine resins such as FET and other resins.

Usable as the metal sheet 4 to be laminated on said material $a_1$ are preferably a metal sheet which has been surface-treated such as a galvanized iron sheet, a colored zinc sheet, a vinyl chloride-coated steel sheet, a fluorine resin-coated steel sheet, an aluminium sheet, a colored aluminium sheet, an aluminium foil, a kraft paper-laminated aluminium sheet, a stainless steel sheet, a colored stainless steel sheet, a lead sheet and the like.

When vibration is applied to the aforesaid constraint type of vibration damper, the "shearing deformation" occurs in the viscoelastic polymeric layer sandwiched between the metal sheets as already mentioned. Due to the viscoelastic behavior of the polymer, however, a part of the "shearing deformation" of the viscoelastic layer is transformed into thermal energy so that the vibration of the the vibration damper is absorbed by the thermal energy of the viscoelastic layer, the vibration is gradually damped down. The vibration damping capacity of this vibration damper is quantitatively expressed in terms of a loss factor $=\eta$. For vibration damping purposes, a loss factor $\eta$ of at least 0.01 may be applicable depending upon conditions, although an ideal loss factor is at least 0.05.

The loss factor of each of the aforesaid vibration dampers varies depending upon the viscoelasticity of the sandwiched viscoelastic polymeric layer. Since the viscoelasticity of general viscoelastic polymeric materials vary largely in a temperature range of 0° to 150° C., the loss factor of vibration dampers varies in such a temperature region, correspondingly.

In each of the constraint type of vibration dampers according to the aforesaid embodiments, the hot-melt-adhesive synthetic resin film 3 having a high melting point, which forms a part thereof, serves to laminate together the two viscoelastic polymeric layers 2 with a strong adhesive force and causes the shearing deformation effective for vibration damping to occur easily in the viscoelastic polymeric layer. Such a synthetic resin film itself has rigidity and makes a contribution to an increase in pressure resistance, since it produces an effect as if a single thin metal sheet is interlaminated in the viscoelastic layer.

The viscoelastic polymeric layer forming a part of the aforesaid contraint type of vibration dampers is generally broken down into the rubber and synthetic resin systems. In view of temperature dependency, preference is given to the rubber system. That is, a synthetic resin undergoing large thermal changes (and having a low melting point) is so narrow in the secondary transition region (a transition of a viscoelastic substance from a glass region to a rubber region) that it passes sharply into the rubber region, resulting in a sharp vibration damping curve defining a narrow temperature region.

Since rubber undergoes no fusion at elevated temperatures and is unlikely to change under the action of heat, on the other hand, such a transition region as mentioned above is so enlarged that a certain or higher vibration damping capacity is obtained in a wider temperature region. Thus, rubber is so less in temperature dependency than synthetic resins that it can be used in a wider temperature region.

In the aforesaid constraint type of vibration dampers, said viscoelastic polymeric layer in the form of a single layer rather than a laminated layer is more advantageous in terms of pressure resistance. For instace, when a single layer of rubber is vertically compressed, the rubber swells out laterally in curved forms. However, laminated rubber is very limited in the amount of swelling-out, since its lateral movement is contrained by an adhesive force between it and a metal sheet bonded to it. With the laminated rubber, it is therefore possible to obtain large rigidity in the vertical direction. On the other hand, since adhesion presents no constraint condition in the shearing deformation occurring in the horizontal direction, the same rigidity is obtained with both the single- and laminated-layers of rubber. In other words, the laminated rubber is characterized in that it shows increased rigidity in the vertical direction but softness typical of rubber in the horizontal direction, and is restored to its orginal state due to its own restoring force.

In the case of the aforesaid constraint type of vibration dampers, it is found in view of the foregoing considerations that to increase the thickness of rubber without lamination results in increased damping capacity but decreased pressure resistance. Advantageous for improved vibration damping capacity is therefore to increase the thickness of rubber by lamination, thereby maintaining the pressure resistance thereof.

Referring then to the metal sheet(s) forming a part of the aforesaid constraint type of vibration dampers, it is to be noted for the determination of its thickness that an increses in its thickness leads to increased strength but decreased vibration damping capacity. Further, since how easily the vibration dampers vibrate depends upon the total weight of the metal sheets even when they are different in thickness, the vibration damping capacity is not affected by which of the metal sheets is located in opposition to a vibrator.

Although no particular limitation is imposed upon the thickness of said metal sheet 1, viscoelastic polymeric layer 2, hot-melt-adhesive resin film 3 and metal sheet 4, it is general that said metal sheets 1 and 4 are in a range of 0.2 to 1.0 mm, said viscoelastic polymeric layer 2 in a range of 0.1 to 0.5 mm and said resin film 3 in a range of 0.03 to 0.1 mm.

Figure 9A:
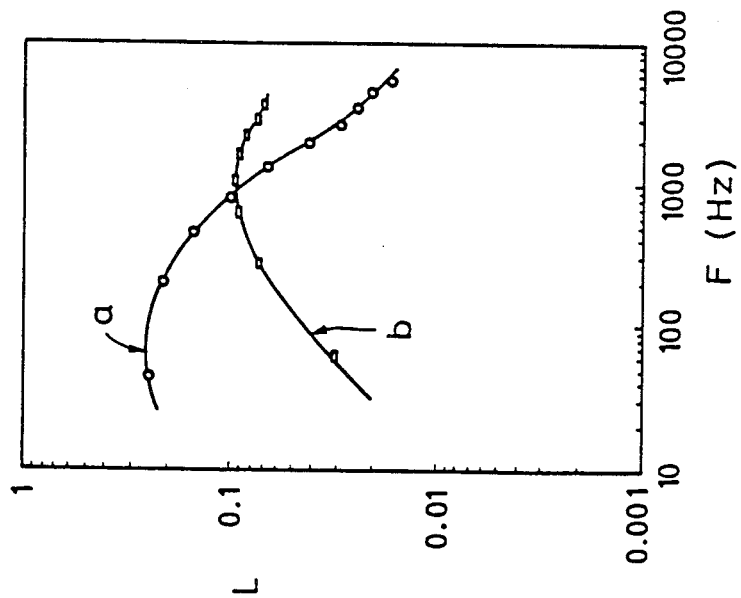
FIGS. 9A to 9D are graphical views illustrating vibration damping capacities.
Figure 9B:
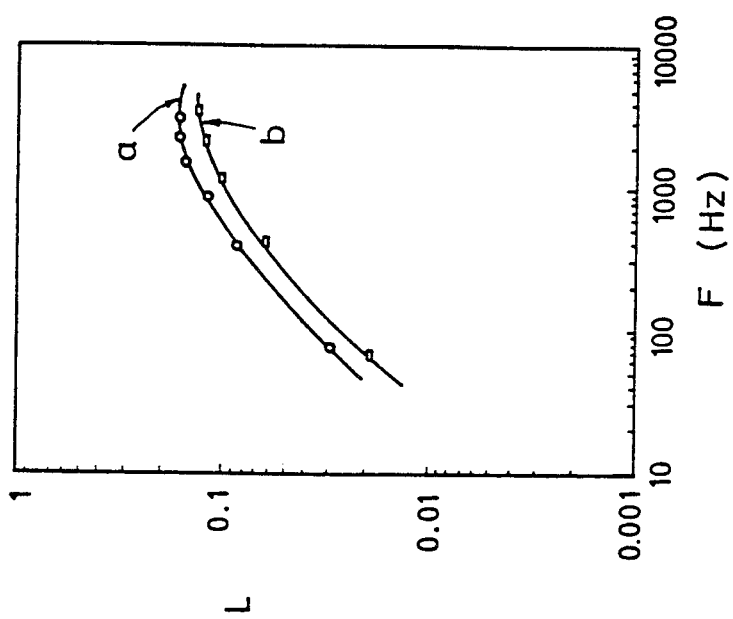
Figure 9C:
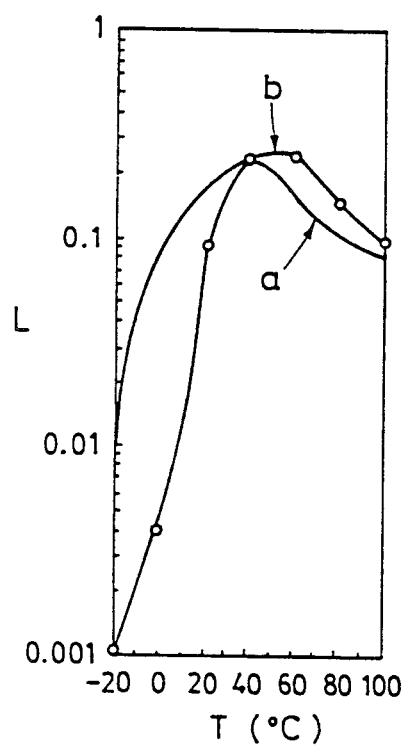
Figure 9D:
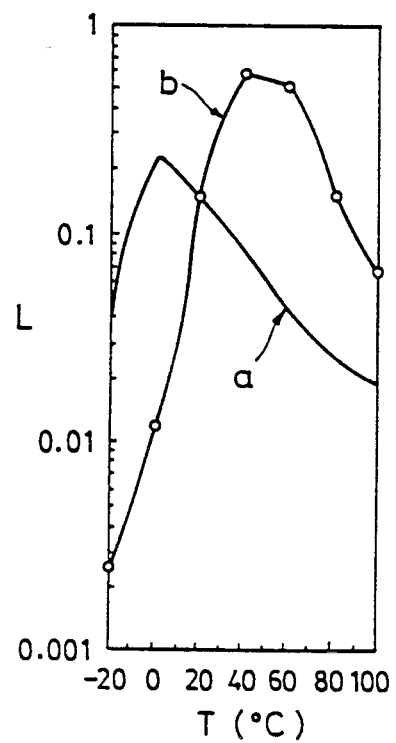

FIGS. 9A to 9D are graphical views illustrating the vibration damping capacity of the vibration damper b according to the present invention while comparing with that of a conventional vibration damper a. FIGS. 9A (at 20° C.), 9B (at 100° C.) and FIGS. 9C (at a frequency of 1 KHz), 9D (at a frequency of 5 KHz) illustrate the damping capacities in terms of the relations between the frequency F and the loss factor L and the temperature T and the loss factor L, respectively.

DAMPING CAPACITY TESTING

Prepared from a vibration damper was a rectangular sample, which was then vibrated at its center with an electrically powered vibrator. While measuring the force and acceleration of vibration with an impedance head inserted therethrough, the frequency applied was varied to measure the mechanical impedance at the point of vibration and calculate a loss factor (providing an indication of how rapidly the vibration damps down) from a resonance curve.

Figure 10:
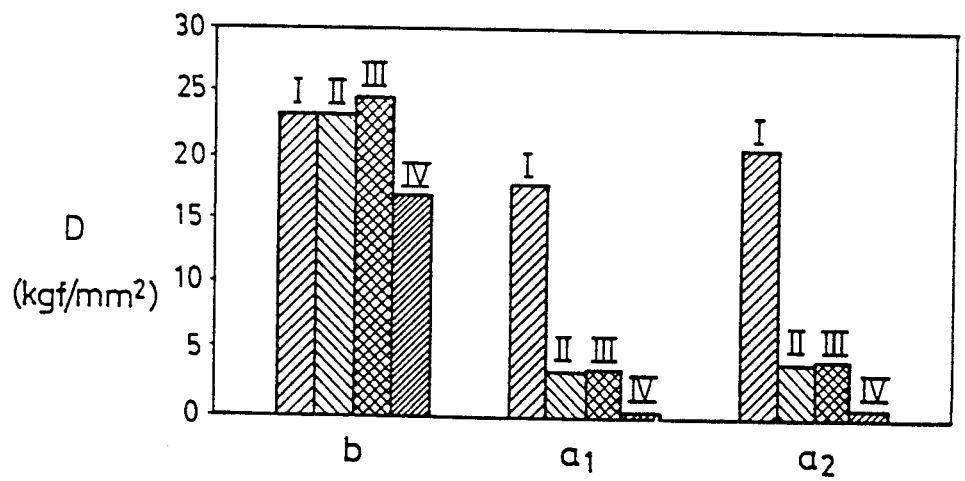
FIG. 10 is a graphical view illustrating the resistance to solvents and environments of a vibration damper.

FIG. 10 is a graphical view showing the resistance to solvents and environments of the vibration damper b according to the present invention while comparing with that of conventinal vibration dampers $a_1$ and $a_2$ to be described later, wherein D stands for the adhesive strength and I, II, III and IV indicate the adhesive strength measured under normal conditions of 25° C., at 120° C. in Freon (+oil), at 160° C. in a refrigeration machine oil and at 150° C. in a hot atmosphere.

Resistance-To-Solvents and -Environments Testing

On the basis of the procedures of T-peeing testing, samples of vibration dampers were immersed in atmospheres such as Freon (oil) and a refrigeration machine oil under the predetermined conditions, followed by cooling at normal temperature. Thereafter, the samples were mounted on a tensile tester to determine their peeling strength (adhesive strength).

Figure 11:
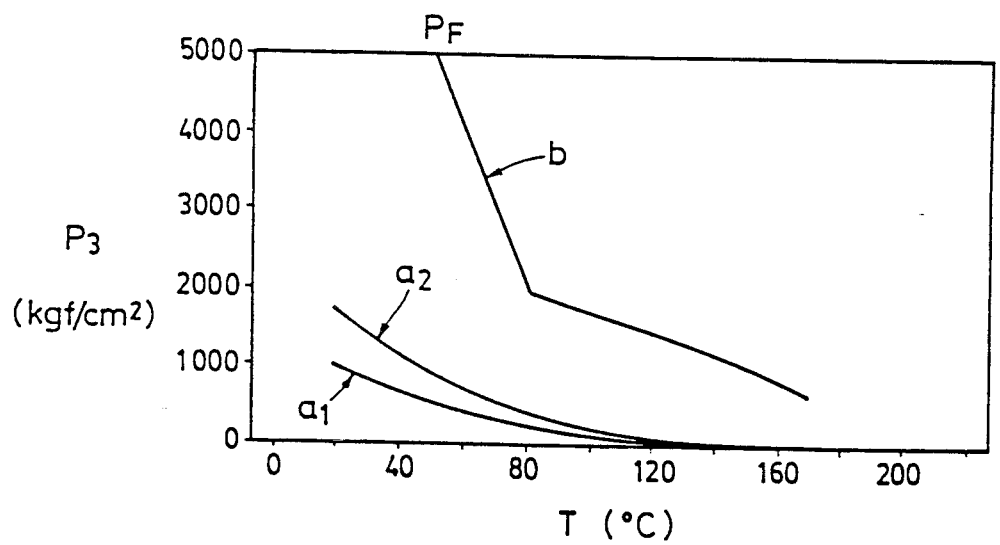
FIG. 11 is a graphical view illustrating the resistance to heat and pressure of a vibration damper.

FIG. 11 is a graphical view illustrating the resistance to heat and presssure of the vibration damper b while comparing with that of the conventional dampers $a_1$ and $a_2$ to be described later, wherein $P_3$ is the pressure applied, T the temperature and $P_F$ the flow-limit pressure.

Resistance-To-Heat and -Pressure Testing

A sample of a vibration damper was placed and pressed on a surface table of a hot-press tester at the predetermined temperature and pressure for a certain time to observe the sample's state (flowing and peeling of resin and rubber), and connection is made by a line between the temperatures and pressures at which no flowing, etc. occurred at all to obtain a critical resistance-to-heat and-pressure curve.

The vibration damper used as the sample in each of the aforesaid testings was prepared by the hot-melt-adhesion of two materials, each being obtained by previously forming a viscoelastic layer of acrylonitrile-butadiene rubber (of 0.12 mm in thickness) on a rust-proofed cold-rolled steel sheet (of 0.25 mm in thickness), through a polyamide film (having a melting point of 175° C. and a thickness of 0.03 mm), while the viscoelastic layers were arranged in opposition to each other.

The conventional damper $a_1$ is the resin type of vibration damper obtained by the lamination of two colored cold-rolled steel sheets (of 0.4 mm in thickness) with a polyethylene resin (of 0.06 mm in thickness) providing a viscoelastic layer.

The conventional damper $a_2$ is the rubber type of vibration damper obtained by the lamination of two cold-rolled steel sheets (of 0.25 mm in thickness) and a butyl rubber sheet (of 1.0 mm in thickness) interposed therebetween with the use of a polyethylene resin (of 0.06 mm in thickness).

A comparison of the present vibration damper with the conventional ones has indicated that, as illustrated in FIGS. 9A to 9D, the present damper shows improved vibration damping capacity from a moderate temperature region (40°-50° C.) to a high temperature region (100° C.) and relatively low temperature dependency. Referring to the resistance to solvents and environments as illustrated in FIG. 10, the present damper offers no adhesion problem in most atmospheres so that it cannot only be used with no difficulty but undergoes no large change in the damping effect because of the effect of the shearing defomation kept intact. Turning to the resistance to heat and pressure as illustrated in FIG. 11, it has been found that the present damper shows no sign of flowing even under considerably high pressure in a normal to moderate temperature region (20°-80° C.). Further, practically satisfactory resistance to pressure is achieved even in a moderate to high temperature region (80°-160° C.).

Reference will now be made to an example wherein the vibration damper used as the sample in the aforesaid testings was applied as a damper in a refrigeration machine's compressor.

The aforesaid sample was punched into a gasket, which was then actually mounted in the compressor for the durability testing conducted in a severe environment represented by an internal temperature of 150° C., a Freon 12/refrigeration machine oil atmosphere, a flow rate of 80 m/s, a load of 1000 kgf/cm$^2$ applied to the damper and a length of time of as long as 300 hours. In consequence, it has been found that the gasket produces a damping effect especially in a frequency range of 1 to 4 KHz, resulting in improvements in the preventin of noise and durability. It has also been ascertained that the gasket sample has the desired capacity, since the compressor continues to operate normally without clogging of nozzles and filters in the compressor system which may otherwise be caused by flowing, dislocation and elution of the damper and that, after testing, the sample shows no sign of any abnormality.

The above capacity is said of the vibration damper illustrated in FIG. 1. With the vibration damper shown in FIG. 2, however, it is also possible to obtain the substantially same vibration damping capacity and resistance to solvents and heat/pressure as those achieved with the damper of FIG. 1. In particular, the damper of FIG. 2 is useful in applications for which the resistance to heat/pressure is needed, and to use a colored or stainless steel sheet as the metal sheet 4 makes it fit for cladding panels required to have an aesthetic appearance.

The vibration dampers of the structures shown in FIGS. 3, 4, 5 and 8 are best-suited for use with various equipment for which damping and sealing effects are needed simultaneously, since they are provided on one or both surfaces with the viscoelastic polymeric layer or layers 2.

In other words, if a damper is used separately from a sealant in applications where the durability of equipment and the prevention of noise, resonance, etc. are required together with sealing, not only is the number of the parts involved increased but also their installation is timeconsuming and troublesome, thus leading to a rise in the cost. Although conventional joint sheets, etc. are found to have some vibration damping effect, yet they do not stand up to use because of a sharp drop of their effect at high temperatures and for insufficieny of their strength relative to enhanced performance of equipment.

Figure 9E:
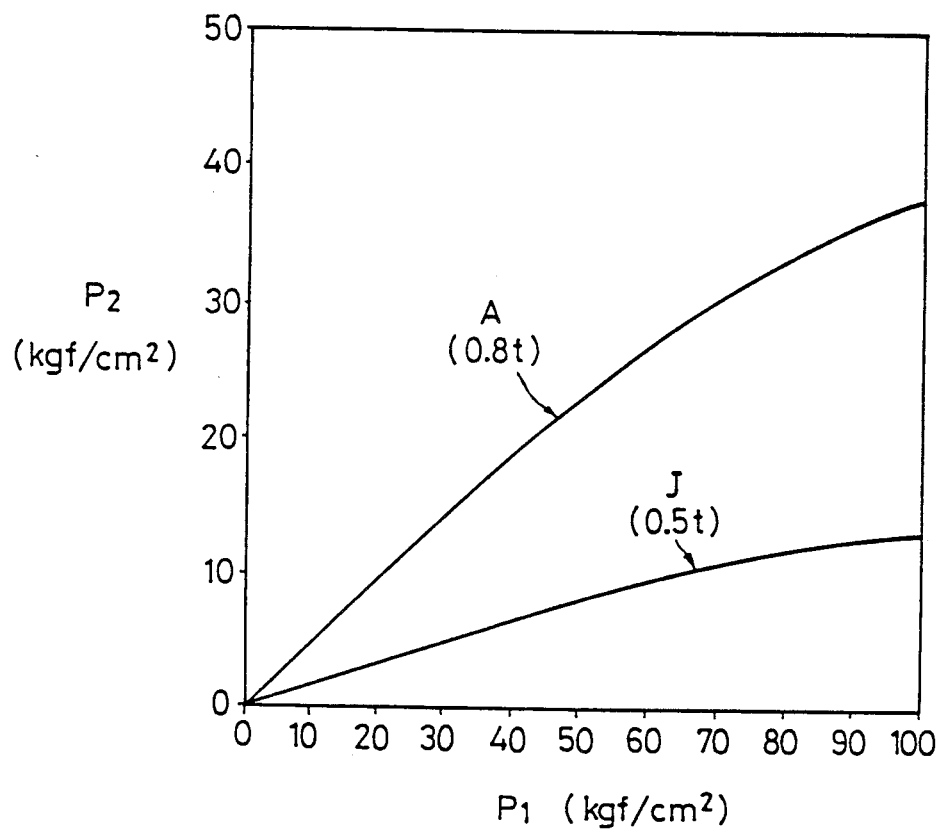
FIG. 9E is a graphical view illustrating the sealing pressure of a vibration damper.

FIG. 9E is a graphical view illustrating a comparison of the vibration damper A of the structure shown in FIG. 3 with the aforesaid joint sheet J in terms of the $P_1$ to $P_2$ relation.

As mentioned above, the vibration damper of the aforesaid structure can sufficiently meet resistance inevitable to various environments.

The vibration dampers of the aforesaid structures may effectively be used as the noise-preventing materials for disc brakes.

Heretofore, there has been known a system wherein a rubber-coated steel sheet is attached to a back side of a disc pad to reduce a high-frequency (4 to 8 KHz) noise generated during braking. However, said rubber-coated steel sheet is found to lose its effect at a relatively early stage due to rubber deteriorations occuring at high temperatures (reaching instantaneously as high as 200° C.). With the vibration dampers of the present invention, however, it is possible to prevent the reduction of their vibration damping effect by reason that thermally deteriorative rubber (or resin) portions are constrained inside. Since the present dampers are higher than the conventional ones in the damping capacity level, some redution of damping capacity, if any, poses no problem.

Reference will now be made to the soundproofing structures using the vibration damping materials of the present invention.

Conventional soundproofing structures known for a noise generating source such as a duct include a combination of a sound absorbing material such as rock wool or glass wool with a sound insulating material such as an iron or lead sheet, mortar or hard cement provided around a noise generating portion and an outermost protecting cladding panel such as a colored galvanized iron sheet, a stainless steel sheet or an aluminium sheet, all being provided by a soundproof lagging method.

In order to increase the amount of noise to be reduced, such soundproofing structures as mentioned above generally make use of means for increasing the weight or number of layers of the sound absorbing and insulating materials. However, the aforesaid lagging method is disadvantageous in that since the soundproofing materials are wound directly around the noise source, vibration is propagated from the soundproofing materials to the outermost cladding panel through support fittings, from where it is re-radiated as a sound.

However, if the vibration damping material of the present invention is used for the outermost cladding panel of the aforesaid soundproofing structures, it is then possible to obtain a soundproofing effect better than that achieved with the conventional soundproofing structures, even when the sound insulating material such as a lead sheet, an iron sheet, mortar or hard cement is removed.

Figure 12:
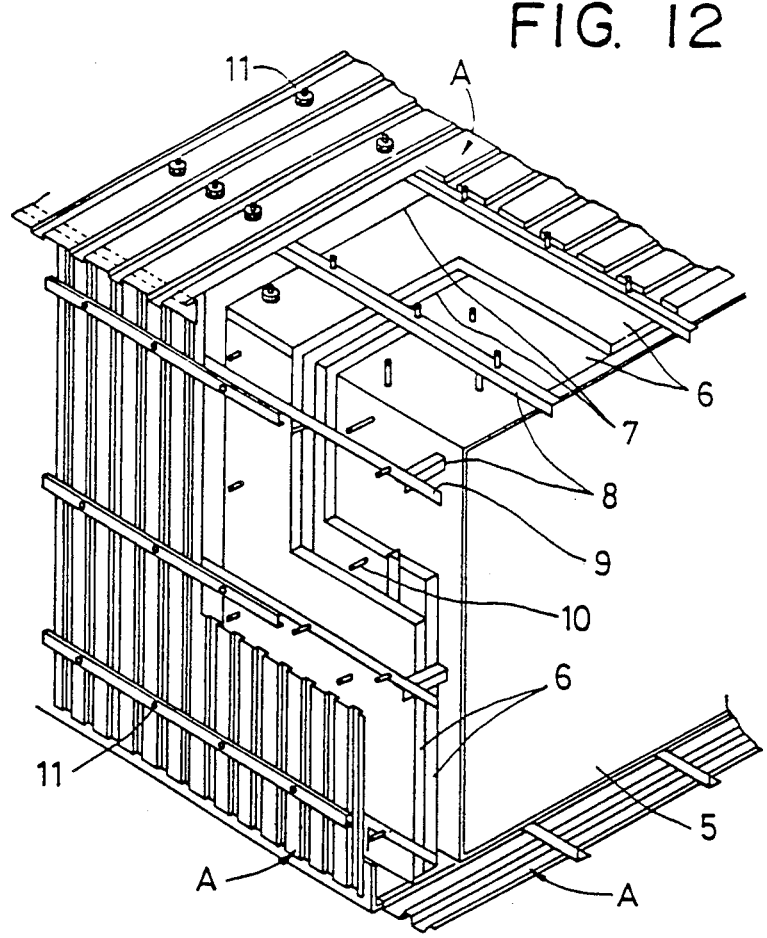
FIG. 12 is a perspective view of a soundproofing structure using a vibration damper of the present invention.

One embodiment of the soundproofing structure for a duct is illustrated in FIG. 12, wherein reference numeral 5 stands for a duct casing, 6 a sound absorbing material, 7 a sound insulating material, 8 a support stay, 9 a support angle, 10 a stud bolt, 11 a clamper, and A a vibration damper of the present invention in the corrugated form.

In view of design, the sound absrobing and insulating materials forming the soundproofing structure of FIG. 12 may be used in various combinations.

While comparing with a comparison example, FIGS. 14A–14C, 15A–15C, 16A–16C and 17A–17C illustrate the relations between typical combinations of the sound absorbing andh insulating materials and the attenuation of vibration through soundproof lagging structures. In these drawings, A indicates a vibration damper (the rubber type of vibration damper illustrated in FIG. 2), A' a cladding panel, 5 a duct casing, 6 a sound absorbing material of rock wool, and 7 a sound insulating material (a soft sound insulating sheet formed by filling an inorganic material of high density in synthetic rubber, vinyl chloride or the like). In the graphs of FIGS. 14C, 15C, 16C and 17C, 1 stands for an attenuation curve of the soundproofing structure according to the present invention, 2 denotes an attenuation curve of the soundproofing structure according to the comparison example, At indicates an amount of attenuation, and F presents frequencies.

As can be appreciated from the graphs, it has been found that the soundproofing structure using the damper for the cladding panel is larger in the amount of attenuation than the comparison example using an oridnary cladding panel. With the soundproofing structure according to the present invention, it is also possible to reduce the number of layers and weight of the sound absorbing and insulating materials.

FIGS. 18 to 21 show another combinations of the sound absorbing and insulating materials in the aforesaid soundproofing structure.

Figure 13:
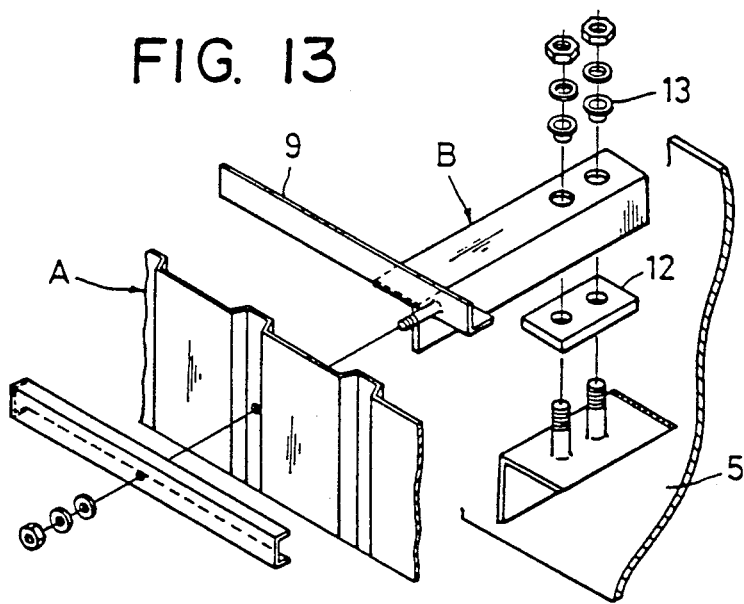
FIG. 13 is a perspective view showing a portion of a vibration insulating mechanism.
Figure 14A:
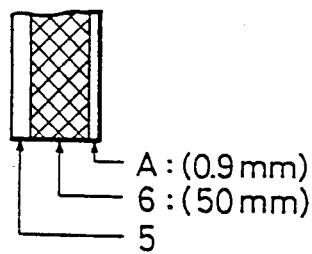
FIGS 14A–14B, 15A–15B, 16A–16B and 17A–17B are side views of various soundproofing structures.
Figure 14B:
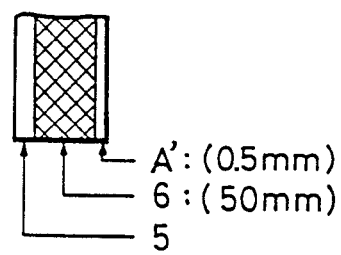
Figure 14C:
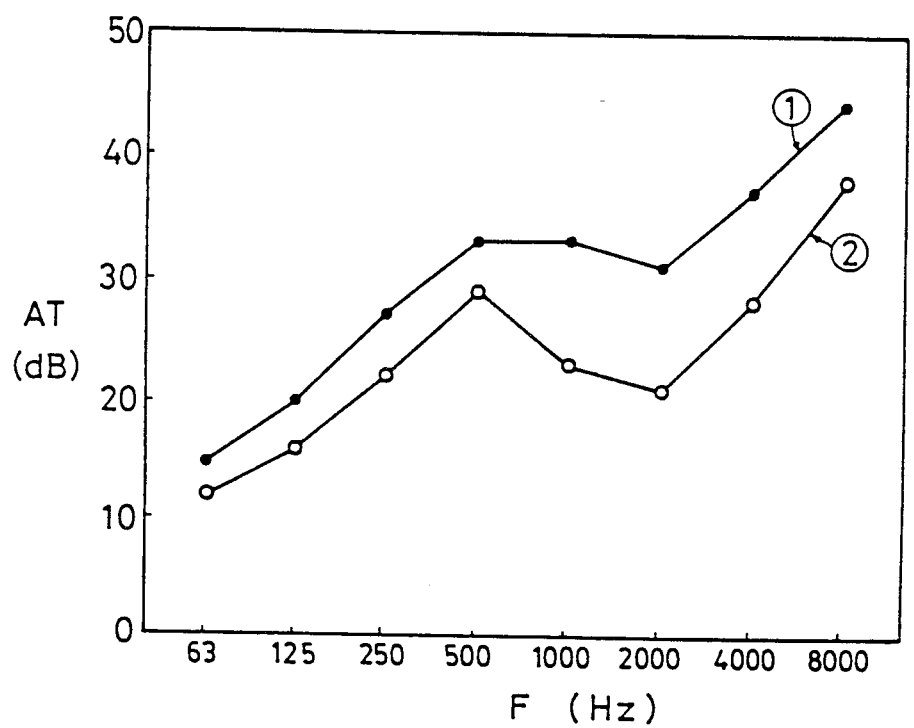
FIGS. 14C, 15C, 16C and 17C are graphical views illustrating the amount of attenuation in the soundproofing structures.
Figure 15A:
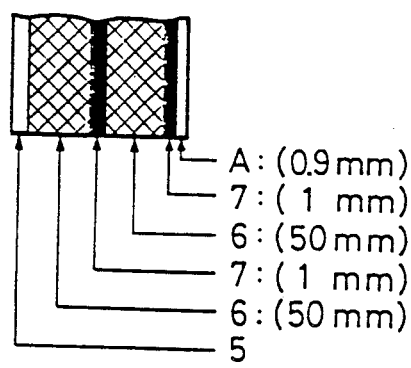
Figure 15B:
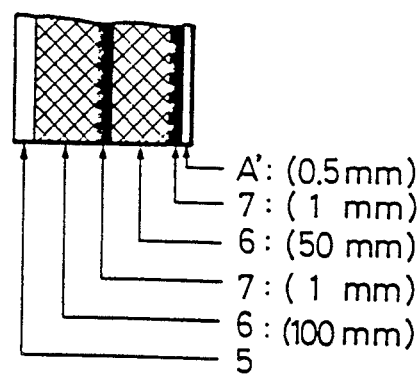
Figure 15C:
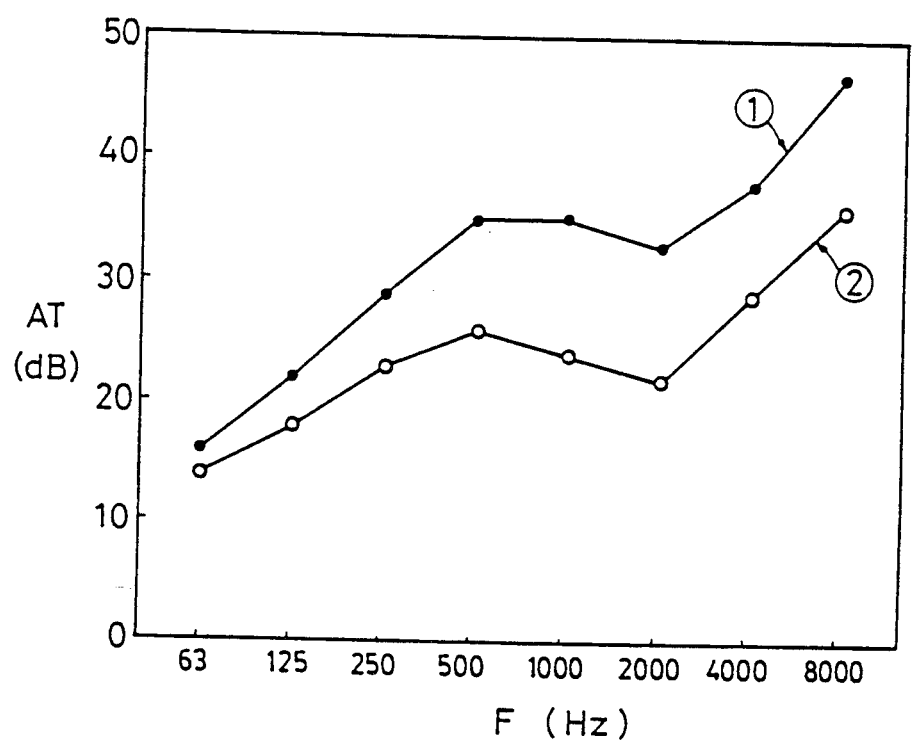
Figure 16A:
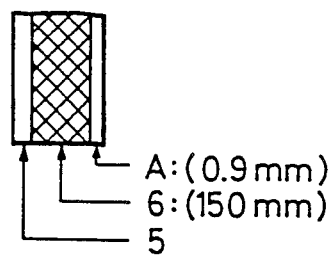
Figure 16B:
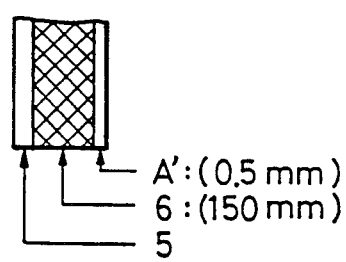
Figure 16C:
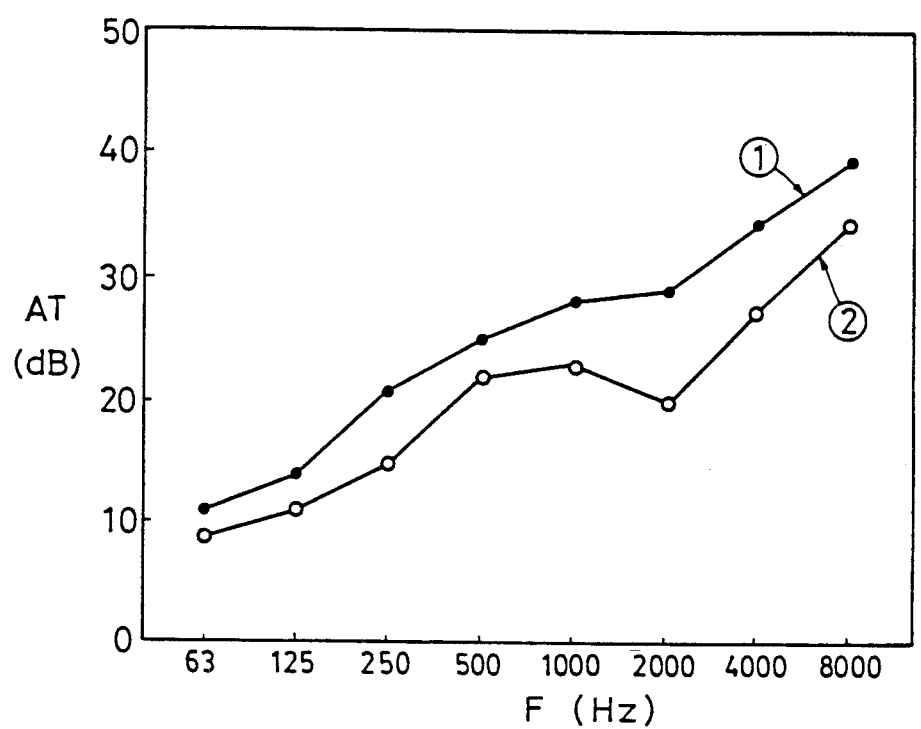
Figure 17A:
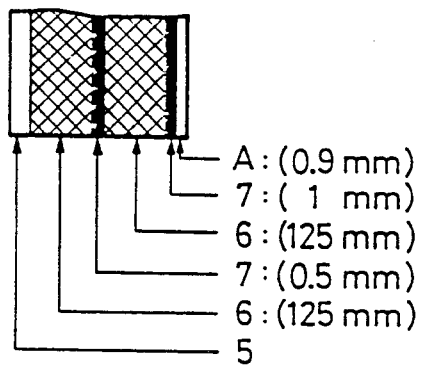
Figure 17B:
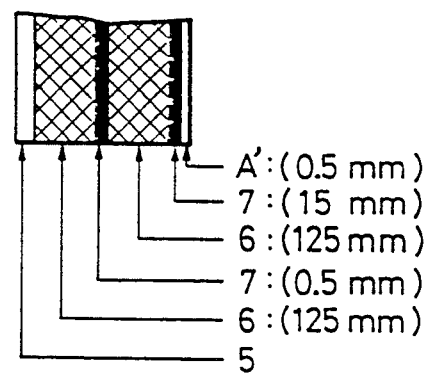
Figure 17C:
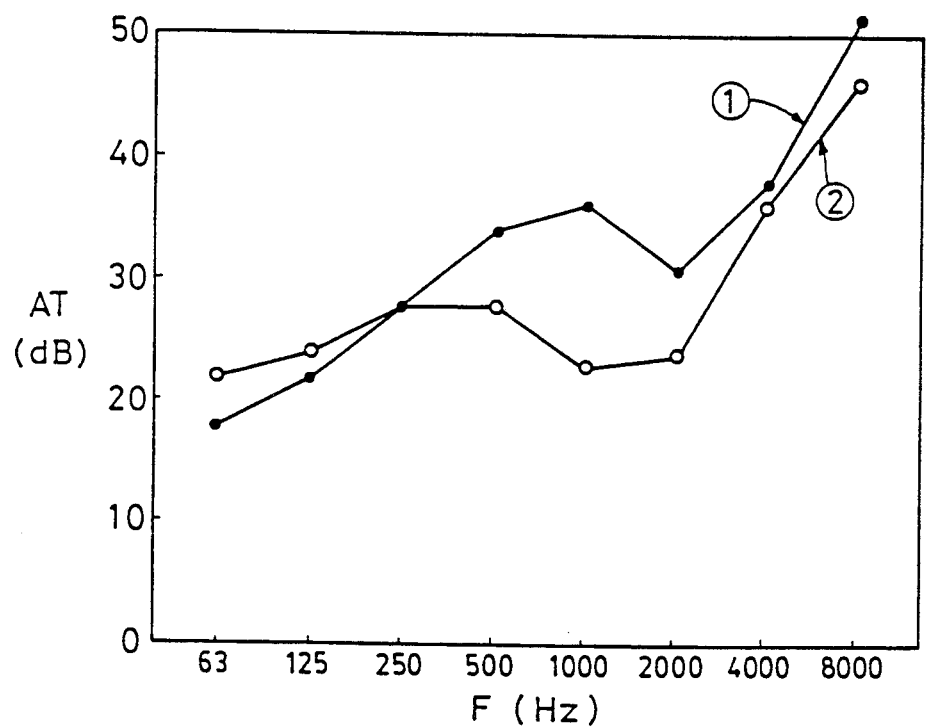
Figure 21:
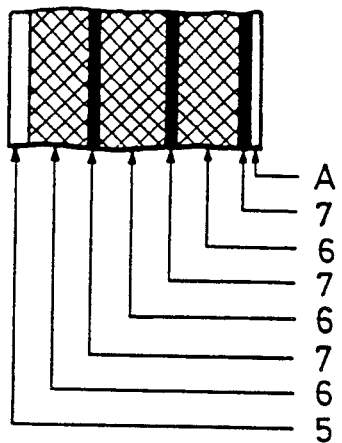
FIGS. 18 to 21 are side views showing another soundproofing structures.
Figure 18:
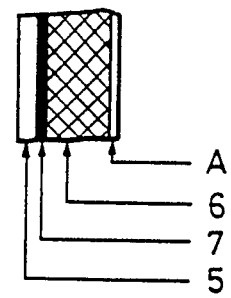
Figure 19:
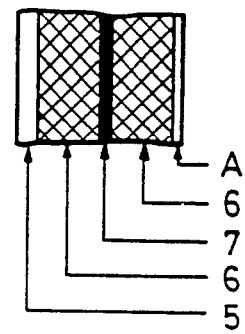
Figure 22:
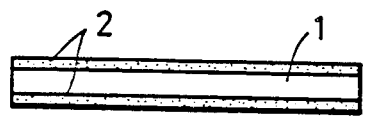
FIGS. 22 and 23 are side views showing conventional vibration dampers.
Figure 23:
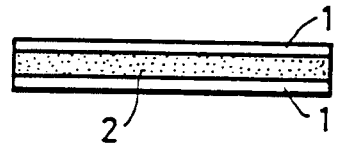
Figure 20:
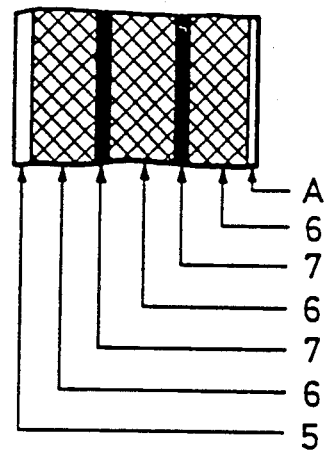

In the aforesaid soundproofing structure, the outermost vibration damper is connected to and supported by the duct casing that is a noise generating portion through support fittings, as is the case with a conventional cladding panel. As illustrated in FIG. 13, however, if a receiver 12 and seats 13, both being formed of rubber, etc. are incorporated into a part of a support fitting B with additional provision of vibration preventing means for cutting off direct transmission of vibration generating from the duct to the vibration damper, it is then possible to achieve a further increase in the vibration damping capacity.

According to the present invention wherein, as detailed above, a metal sheet having a rubber- or synthetic resin-base viscoelastic polymeric layer or layers formed on one or both sides is combined with a metal sheet including no viscoelastic polymeric layer to provide basic materials, and said materials are located in opposition to each other through the viscoelastic layer(s) and laminated together with a hot-melt-adhesive resin film having a high melting point, thereby obtaining a vibration damper, the following effects are obtainable.

(1) Since there is obtained a laminate of the viscoelastic layer preformed on the metal sheet with the synthetic resin film used to laminate the materials together, a vibration damping capacity more improved than that of conventional vibrations dampers is achievable.

(2) An improved vibration damping capacity is achievable especially in environments where various factors such as heat, pressure, oils and solvents are applied alone or in combination.

(3) Vibration dampers fit for the intended purposes can easily be obtained depending upon the combinations of said materials.

For instance, if said materials are combined with each other in such a way that two viscoelastic layers are obtained, it is then possible to obtain an additional increase in the vibration damping capacity.

If the two viscoelastic layers are isolated from each other by a metal sheet, it is then possible to obtain more improved resistance to pressure and heat.

Where a thickness has to be added to the vibration damper, it is possible to better the vibration damping capacity without incurring large changes in the flexural rigidity, thereby acieving reductions in the weight and price.

If said materials are combined with a sheet of a different metal providing an intermediate layer, it is possible to maintain the mechanical strength of the whole vibration damper and reduce the weight thereof at the same time.

(4) If a viscoelastic layer is formed on the surface of the vibration damper comprising the combination of said materials, it is then possible to obtain vibration damping and sealing effects at the same time.

(5) If use is made of materials having a viscoelastic polymeric layer or layers formed on one or both sides of a metal sheet, it is then possible to make use of conventional steps for producing vibration dampers, thereby producing the dampers at low costs on an mass-producible scale.

(6) When comparing with the soundproofing structures using conventional metal cladding panels, the soundproofing structures using the vibration dampers of the structures according to the present invention cannot only achieve increased attenuation of vibration but have also a remarkable effect upon the reductions in the number of layers and weight of the absorbing and insulating materials.

It is understood that the above embodiments are simply illustrative of the application of principles of the invention and many other modifications may be made without departing from the spirit and scope of the invention.

The embodiments of the invention in which an exclusive property or privilege is claimed are defined as follows;

1. A soundproofing structure comprising in combination: a noise generating portion, a sound absorbing material surrounding said noise generating portion, and a vibration damping material which forms a cladding panel of said sound absorbing material; wherein said vibration damping material includes first and second materials, each being formed of a metal sheet having a rubber- or synthetic resin-base viscoelastic polymeric layer formed on one side, and includes a hot-melt-adhesive synthetic resin layer having a high melting point, which serves to bond together said first and second materials, while they are arranged in opposition to each other through said viscoelastic polymeric layers, and wherein said metal sheets, said polymeric layers and said resin layer all extend substantially parallel to each other.

2. A vibration damping material comprising in combination:
   first and second materials, each being formed of a metal sheet having a rubber- or synthetic resin-base viscoelastic polymeric layer formed on one side, and
   a hot-melt-adhesive synthetic resin layer having a high melting point, which serves to bond together said first and second materials, while they are arranged in opposition to each other through said viscoelastic polymeric layers, wherein said metal sheets, said polymeric layers and said resin layer all extend substantially parallel to each other.

3. A vibration damping material as claimed in claim 2 wherein said metal sheets are each one of an iron sheet, a zinc sheet, an aluminum sheet, a stainless steel sheet, a brass sheet, a copper sheet, a zinc sheet, a nickel sheet and a tin sheet.

4. A vibration damping material as claimed in claim 2, wherein said viscoelastic polymeric layer is one of acrylonitrile-butadiene rubber, styrene-butadiene rubber, natural rubber, butyl rubber, an elethylene-propylene polymer, butadiene rubber, isoprene rubber, chloroprene rubber, ethylene propylene rubber, acrylic rubber, silicon rubber, fluorine rubber, epichlorohydrin rubber, urethane rubber, polynorbornene rubber and ethylene acrylic rubber.

5. A vibration damping material as claimed in claim 2, wherein said synthetic resin layer is one of nylons, polyesters, polypropylenes, polyethylenes and fluorine resins.

6. A vibration damping material comprising in combination:
   first and second materials, each being formed of a metal sheet having rubber- or synthetic resin-base viscoelastic polymeric layers formed on both sides, and
   a hot-melt-adhesive synthetic resin layer having a high melting point, which serves to bond together said first and second materials, while they are arranged in opposition to each other through said viscoelastic polymeric layers, wherein said metal sheets, said polymeric layers and said resin layer all extend substantially parallel to each other.

7. A vibration damping material as claimed in claim 6, wherein said metal sheets are each one of an iron sheet, a zinc sheet, an aluminum sheet, a stainless steel sheet, a brass sheet, a copper sheet, a zinc sheet, a nickel sheet and a tin sheet.

8. A vibration damping material as claimed in claim 6, wherein said viscoelastic polymeric layer is one of acrylonitrile-butadiene rubber, styrene-butadiene rubber, natural rubber, butyl rubber, an elethylene-propylene polymer, butadiene rubber, isoprene rubber, chloroprene rubber, ethylene propylene rubber, acrylic rubber, silicon rubber, fluorine rubber, epichlorohydrin rubber, urethane rubber, polynorbornene rubber and ethylene acrylic rubber.

9. A vibration damping material as claimed in claim 6, wherein said synthetic resin layer is one of nylons, polyesters, polypropylenes, polyethylenes and fluorine resins.

10. A vibration damping material comprising in combination:
 a first material formed of a metal sheet having a rubber- or synthetic resin-base viscoelastic polymeric layer formed on one side,
 a second material formed of a metal sheet having rubber- or synthetic resin-base viscoelastic polymeric layers formed on both sides, and
 a hot-melt-adhesive synthetic resin layer having a high melting point, which serves to bond together said first and second materials, while they are arranged in opposition to each other through said viscoelastic polymeric layers, wherein said metal sheets, said polymeric layers and said resin layer all extend substantially parallel to each other.

11. A vibration damping material as claimed in claim 10, wherein said metal sheets are each one of an iron sheet, a zinc sheet, an aluminum sheet, a stainless steel sheet, a brass sheet, a copper sheet, a zinc sheet, a nickel sheet and a tin sheet.

12. A vibration damping material as claimed in claim 10, wherein said viscoelastic polymeric layer is one of acrylonitrile-butadiene rubber, styrene-butadiene rubber, natural rubber, butyl rubber, an elethylene-propylene polymer, butadiene rubber, isoprene rubber, chloroprene rubber, ethylene propylene rubber, acrylic rubber, silicon rubber, fluorine rubber, epichlorohydrin rubber, urethane rubber, polynorbornene rubber and ethylene acrylic rubber.

13. A vibration damping material as claimed in claim 10, wherein said synthetic resin layer is one of nylons, polyesters, polypropylenes, polyethylenes and fluorine resins.

14. A soundproofing structure comprising in combination: a noise generating portion, a support fitting, a vibration damping material which is connected to said noise generating portion by said support fitting, and sound-proofing means for cutting off direct propagation of vibrations from said noise generating portion to said vibration damping material through said support fitting; wherein said vibration damping material includes first and second materials, each being formed of a metal sheet having a rubber- or synthetic resin-base viscoelastic polymeric layer formed on one side, and includes a hot-melt-adhesive synthetic resin layer having a high melting point, which serves to bond together said first and second materials, while they are arranged in opposition to each other through said viscoelastic polymeric layers, and wherein said metal sheets, said polymeric layers and said resin layer all extend substantially parallel to each other.

15. A soundproofing structure comprising in combination: a noise generating portion, a sound absorbing material surrounding said noise generating portion, and a vibration damping material which forms a cladding panel of said sound absorbing material; wherein said vibration damping material includes first and second materials, each being formed of a metal sheet having rubber- or synthetic resin-base viscoelastic polymeric layers formed on both sides, and includes a hot-melt-adhesive synthetic resin layer having a high melting point, which serves to bond together said first and second materials, while they are arranged in opposition to each other through said viscoelastic polymeric layers.

16. A soundproofing structure comprising in combination: a noise generating portion, a support fitting, a vibration damping material which is connected to said noise generating portion by said support fitting, and soundproofing means for cutting off direct propagation of vibrations from said noise generating portion to said vibration damping material through said support fitting; wherein said vibration damping material includes first and second materials, each being formed of a metal sheet having rubber- or synthetic resin-base viscoelastic polymeric layers formed on both sides, and includes a hot-melt-adhesive synthetic resin layer having a high melting point, which serves to bond together said first and second materials, while they are arranged in opposition to each other through said viscoelastic polymeric layers.

17. A soundproofing structure comprising in combination: a noise generating portion, a sound absorbing material surrounding said noise generating portion, and a vibration damping material which forms a cladding panel of said sound absorbing material; wherein said vibration damping material includes a first material formed of a metal sheet having a rubber- or synthetic resin-base viscoelastic polymeric layer formed on one side, includes a second material formed of a metal sheet having rubber- or synthetic resin-base viscoelastic polymeric layers formed on both sides, and includes a hot-melt-adhesive synthetic resin layer having a high melting point, which serves to bond together said first and second materials, while they are arranged in opposition to each other through said viscoelastic polymeric layers.

18. A soundproofing structure comprising in combination: a noise generating portion, a support fitting, a vibration damping material which is connected to said noise generating portion by said support fitting, and soundproofing means for cutting off direct propagation of vibrations from said noise generating portion to said vibration damping material through said support fitting; wherein said vibration damping material includes a first material formed of a metal sheet having a rubber- or synthetic resin-base viscoelastic polymeric layer formed on one side, includes a second material formed of a metal sheet having rubber- or synthetic resin-base viscoelastic polymeric layers formed on both sides, and includes a hot-melt-adhesive synthetic resin layer having a high melting point, which serves to bond together said first and second materials, while they are arranged in opposition to each other through said viscoelastic polymeric layers.

* * * * *